US012418341B2

United States Patent
Gao et al.

(10) Patent No.: US 12,418,341 B2
(45) Date of Patent: Sep. 16, 2025

(54) FIBER ENABLED OPTICAL WIRELESS COMMUNICATION SYSTEM AND METHOD

(71) Applicant: SOUTHEAST UNIVERSITY, Nanjing (CN)

(72) Inventors: Xiqi Gao, Nanjing (CN); Chen Sun, Nanjing (CN); Jiaheng Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 375 days.

(21) Appl. No.: 17/962,558

(22) Filed: Oct. 10, 2022

(65) Prior Publication Data

US 2023/0044988 A1 Feb. 9, 2023

Related U.S. Application Data

(63) Continuation-in-part of application No. PCT/CN2020/086078, filed on Apr. 22, 2020.

(30) Foreign Application Priority Data

Apr. 10, 2020 (CN) .......................... 202010279850.5

(51) Int. Cl.
  *H04B 10/11* (2013.01)
(52) U.S. Cl.
  CPC .................... *H04B 10/11* (2013.01)
(58) Field of Classification Search
  CPC ...................................................... H04B 10/11
  See application file for complete search history.

(56) References Cited

U.S. PATENT DOCUMENTS 10,461,421 B1  10/2019 Tran
10,849,064 B2 *  11/2020 Heidler ............ H04W 52/0206
(Continued)

FOREIGN PATENT DOCUMENTS

CN  101820352 A  9/2010
CN  103475955 A  12/2013
(Continued)

OTHER PUBLICATIONS

Chen Sun, Beam Division Multiple Access Transmission for Massive MIMO Communications, A Dissertation submitted to Southeast University For the Academic Degree of PhD, 2018, pp. 1-125.
(Continued)

*Primary Examiner* — Pranesh K Barua
(74) *Attorney, Agent, or Firm* — Bayramoglu Law Offices LLC

(57) ABSTRACT

A fiber enabled optical wireless communication (FE-OWC) system and method is provided. An optical antenna composed of an optical fiber transceiving port array and a lens or a reflecting mirror is used to generate optical beams in different directions, such that full-beam coverage of a communication area is implemented. The optical antenna is connected to an optical chain by an optical fiber, the optical chain realizes mutual conversion of an optical signal and an electrical signal, and a baseband signal processing unit which is in electrical signal connection with the optical chain realizes user scheduling, transceiving signal processing, etc. Multi-user multiple-input multiple-output (MIMO) or massive MIMO or beam division multiple access optical wireless communication between a base station and user terminals is implemented by using the optical beams. The FE-OWC system and method may support ultra-high-rate user data transmission and system throughput, and have a low complexity.

8 Claims, 5 Drawing Sheets

(56) References Cited

U.S. PATENT DOCUMENTS

| | | | | |
|---|---|---|---|---|
| 11,139,908 | B2* | 10/2021 | Gao | H04B 10/11 |
| 2009/0232191 | A1* | 9/2009 | Gupta | H04B 10/2575 |
| | | | | 375/216 |
| 2020/0336205 | A1* | 10/2020 | Khatibzadeh | G02B 19/0071 |
| 2021/0152248 | A1* | 5/2021 | Koste | H04J 14/08 |
| 2022/0166137 | A1* | 5/2022 | Galli | H04B 10/00 |
| 2022/0166506 | A1* | 5/2022 | Carraro | H04B 10/116 |
| 2024/0405872 | A1* | 12/2024 | Haas | H04B 10/27 |

FOREIGN PATENT DOCUMENTS

| | | | |
|---|---|---|---|
| CN | 106961309 A | 7/2017 | |
| CN | 107547130 A | 1/2018 | |
| CN | 110535528 A | 12/2019 | |
| WO | 2017059448 A1 | 4/2017 | |
| WO | WO-2019051862 A1 * | 3/2019 | H04B 7/0695 |

OTHER PUBLICATIONS

Chen Sun, et al., Beam Domain Massive MIMO for Optical Wireless Communications With Transmit Lens, IEEE Transactions on Communications, 2019, pp. 2188-2202, vol. 67, No. 3.

Liang Xue-Jun, et al., Channel Feedback Algorithms Based on Opportunistic Beamforming MIMO Systems, Computer Science, 2009, pp. 85-87,95, vol. 36, No. 5.

* cited by examiner

FIBER ENABLED OPTICAL WIRELESS COMMUNICATION SYSTEM AND METHOD

CROSS REFERENCE TO THE RELATED APPLICATIONS

This application is a continuation-in-part application of International Application No. PCT/CN2020/086078, filed on Apr. 22, 2020, which is based upon and claims priority to Chinese Patent Application No. 202010279850.5, filed on Apr. 10, 2020, the entire contents of which are incorporated herein by reference.

TECHNICAL FIELD

The present invention relates to an optical wireless communication technology, and in particular, to an optical antenna, a fiber enabled optical wireless communication (FE-OWC) apparatus, an FE-OWC system and method, and falls within the technical field of mobile communication.

BACKGROUND

With the development of mobile communication, the number of mobile equipment and the demand for a wireless transmission rate are increasing rapidly, and emerging applications such as virtual reality and augmented reality require an extremely high transmission rate. In post-5G and 6G mobile communication systems, a demand for a single-user transmission rate is as high as 10 Gbps and a demand for system throughput is as high as 1 Tbps. However, spectrum resources in a traditional low-frequency band are in a serious shortage, and cannot support ultra-high-rate mobile communication, such that there is a need to use spectrum resources in a higher-frequency band. Optical wireless communication provides extremely abundant spectrum resources by using an optical band, supports ultra-high-rate data transmission, and has a great potential in wireless communications. Compared with radio frequency wireless communication in a high-frequency band, the optical wireless communication also has advantages, such as low complexity of transceiving signal processing and maturity of communication devices and equipment.

Visible light communication is one of the research directions in the optical wireless communication, modulates a signal to the amplitude of visible light, and uses an LED to provide illumination and simultaneously transmit data signals to user terminals. To meet a demand for illumination, the LED generates a wide beam to cover an entire communication area, and simultaneously channel coefficients of the optical wireless communication are of a high correlation, because most scenarios only consider line-of-sight propagation. A single optical transmitting node transmits omni-directional signals, which is usually regarded as a single transmitting antenna and can only transmit a single data stream, and the number of user terminals simultaneously served by a base station limited. In addition, because the modulation bandwidth of LED is about 20 MHz, abundant spectrum resources in the optical wireless communication cannot be fully used, and a transmission rate of the system is relatively low, thereby not meeting the demand for the ultra-high-rate data transmission. Moreover, current visible light communication systems merely consider downlink transmission from a base station to user terminals, and cannot support bi-directional communication.

Another research direction is infrared optical wireless communication. By generating a narrow beam with directivity, energy of an optical signal is concentrated to the user terminal, thereby greatly enhancing the received energy. A laser diode is used to generate an optical signal supporting a transmission rate of tens of Gbps. However, because an infrared beam generated by the laser diode has extremely strong directivity, transceiving devices need to be accurately aligned, thereby greatly increasing the complexity of the system in scenarios such as user movement, and most infrared optical wireless communication systems only consider point-to-point transmission and cannot support simultaneous communication with a plurality or a large number of user terminals.

SUMMARY

Purpose of the present invention: for bottleneck problems of the limited number of service user terminals, small coverage area, high complexity of alignment, and one-way transmission in existing optical wireless communication, the purpose of the present invention is to provide an optical antenna, and an FE-OWC apparatus, and an FE-OWC system and method based on the optical antenna, so as to fully use abundant spectrum resources in an optical band, implement full beam coverage in a communication area, and support high-rate bi-directional communication of mobile terminals, thereby meeting demands for future mobile communication applications.

Technical solution: In order to achieve the above purpose of the present invention, an optical antenna, including an optical fiber transceiving port array and a lens or a reflecting mirror, the optical fiber transceiving port in the optical antenna includes an optical fiber port and a micro-lens, and in order to expand an angular range of the light transmitted and received by the optical fiber port, the micro-lens is arranged close to the optical fiber port; in the process of transmitting a signal, an optical signal transmitted by a single optical fiber port is refracted by the micro-lens, generating an optical beam having a certain angular range; after light transmitted by a single optical fiber transceiving port is refracted by the lens or reflected by the reflecting mirror, an optical beam having a certain angular range is generated in a direction, and light transmitted by different optical fiber transceiving ports is refracted or reflected to different directions; in the process of receiving a signal, receiving light from different directions after being refracted by the lens or reflected by the reflecting mirror is coupled into different optical fiber transceiving ports for receiving, the micro-lens then couples an optical signal within a certain angular range into the optical fiber port, and different optical fiber transceiving ports receive optical signals from different directions; and the optical fiber transceiving port array and the lens or the reflecting mirror are used to generate optical beams in different directions, different optical beams cover different areas, and all the optical beams generated by the optical fiber transceiving port array cover the whole communication area, such that full-beam coverage of the communication area is implemented.

A fiber enabled optical wireless communication (FE-OWC) apparatus, including the optical antenna and an optical chain, the optical antenna is configured to transmit and receive optical signals from different directions, and the optical antenna is connected to the optical chain by means of an optical fiber directly, or an optical switching unit; the optical chain is configured to implement mutual conversion of an optical signal and an electrical signal; and a single FE-OWC apparatus communicates with a single or a set of FE-OWC apparatuses.

Furthermore, the optical chain is configured to implement the mutual conversion of the optical signal and the electrical signal; in the process of transmitting a signal, the electrical signal after adding a bias current drives a laser diode to generate an optical signal corresponding to the electrical signal, or using an external modulator, the optical signal and the electrical signal generated by a laser source are input into the external modulator to generate a corresponding optical signal, and after being amplified by an optical amplifier, the optical signal is transmitted to the optical antenna by means of the optical fiber; and in the process of receiving a signal, a signal received by the optical antenna is transmitted to the optical chain by means of the optical fiber and amplified by the optical amplifier, and the optical signal is detected by a photodetector and converted into a corresponding electrical signal.

Furthermore, when the optical antenna is directly connected to the optical chain, each optical chain corresponds to an optical fiber transceiving port, and the number of optical chains is the same as the number of optical fiber transceiving ports; when the optical antenna is connected to the optical chain by means of the optical switching unit, the number of optical chain is less than or equal to the number of optical fiber transceiving ports, and the optical switching unit is configured to switch a corresponding relationship between the optical chain and the optical fiber transceiving port, and correspond a signal in the optical chain to a beam generated by the optical antenna.

Furthermore, the FE-OWC apparatus at the base station side further includes a baseband signal processing unit which includes an A/D module, a D/A module, and a digital baseband processing and control module; in the process of downlink transmission, the digital baseband processing and control module at the base station side is configured to implement user scheduling and multi-user precoding transmission and generate a transmitting signal of each user terminal, and the D/A module is used to convert the transmitting signal generated by the digital baseband processing and control module into an analog signal and input same into the optical chain; and in the process of uplink transmission, the A/D module is configured to convert an electrical signal output by the optical chain at the base station side into a digital signal, and the digital baseband processing and control module is configured to detect a multi-user receiving signal and recover the transmitting signal of each user terminal.

Furthermore, the FE-OWC apparatus at the user terminal side further includes a baseband signal processing unit which includes an A/D module, a D/A module, and a digital baseband processing and control module; in the process of downlink transmission, the A/D module is configured to convert an electrical signal output by the optical chain at the user terminal side into a digital signal, and the digital baseband processing and control module is configured to detect a receiving signal and recover a transmitting signal of the base station; and in the process of uplink transmission, the digital baseband processing and control module at the user terminal is configured to implement precoding transmission, and the D/A module is used to convert the generated transmitting signal into an analog signal and input same into the optical chain.

Furthermore, the FE-OWC apparatus at the base station side further includes a baseband signal processing unit which includes a baseband modulation module, a baseband demodulation module, and a digital baseband processing and control module; in the process of downlink transmission, the digital baseband processing and control module at the base station side is configured to allocate a non-overlapping beam set for different user terminals and generate a digital baseband signal transmitted to each user terminal, the baseband modulation module is configured to generate an analog baseband signal transmitted to each user terminal, transmit to a corresponding optical chain, and use a corresponding optical fiber transceiving port to transmit; and in the process of uplink transmission, the baseband demodulation module is configured to demodulate an analog baseband receiving signal output by the optical chain at the base station side to generate a digital baseband signal, and the digital baseband processing and control module is configured to recover a transmitting signal of each user terminal based on a beam allocation result and a digital baseband signal on the beam corresponding to each user terminal.

Furthermore, the FE-OWC apparatus at the user terminal side further includes a baseband signal processing unit which includes a baseband modulation module, a baseband demodulation module, and a digital baseband processing and control module; in the process of downlink transmission, the baseband demodulation module at the user terminal side is configured to demodulate an analog signal output by the optical chain to generate a digital baseband signal, and the digital baseband processing and control module is configured to select an optical fiber transceiving port corresponding the base station and recover a transmitting signal at the base station side based on the received digital baseband signal; and in the process of uplink transmission, the digital baseband processing and control module at the base station side is configured to generate an uplink digital baseband transmitting signal, and the baseband modulation module is configured to generate an analog baseband transmitting signal, transmit to the optical chain, and use the corresponding optical transceiving port to transmit to the base station.

A fiber enabled optical wireless communication (FE-OWC) system, a base station and a user terminal of the FE-OWC system are both configured with the FE-OWC apparatus. FE-OWC systems perform multi-user MIMO or Massive MIMO optical wireless communications or beam division multiple access (BDMA) optical wireless communication between base stations and user terminals.

A fiber enabled optical wireless communication (FE-OWC) method, the communication method, based on the FE-OWC system, calculates a link budget of single link transmission and establishes a channel model of electrical signal transmission between transceiving ends; the link budget includes electro-optic conversion at a transmitting end, optical wireless channel gain, optical-electro conversion at a receiving end, and electrical noise at the receiving end; the electro-optic conversion part at the transmitting end establishes a corresponding relationship between optical power output by the transmitting end and an input electrical signal based on an optical-electro property of an electro-optic conversion device; the optical wireless channel gain is wireless channel gain between an optical fiber transceiving port at the transmitting end and an optical fiber transceiving port at the receiving end; the optical-electro conversion at the receiving end considers two processes of the receiving optical signal being amplified by an optical amplifier and detected by a photodetector, and establishes a conversion relationship between an input optical signal and an output electrical signal at the receiving end; the electrical noise at the receiving end includes electrical noise introduced by the optical amplifier and the photodetector, and a relationship between signal power and noise power in an electrical signal received by a single link is established; based on the single link budget, a complete channel model for transmitting the electrical signal from the transmitting end to the receiving end is established; and based on the channel model, multi-user MIMO or massive MIMO or beam division multiple access optical wireless communication method is implemented between a base station and user terminals.

Furthermore, the optical wireless channel gain describes channel gain of optical wireless transmission from the transmitting end to the receiving end, and includes four parts: beam modeling at the transmitting end, channel gain of free space transmission, a ratio of receiving power of the optical fiber transceiving port at the receiving end, and coupling efficiency of the optical fiber port; the beam modeling at the transmitting end describes the optical intensity distribution of a single beam generated by light transmitted by the optical fiber transceiving port after being refracted by a lens or reflected by a reflecting mirror, and as the number of optical fiber transceiving ports at the transmitting end increases, the optical intensities from a single optical fiber transceiving port to different user terminals are asymptotically orthogonal; the channel gain of free space transmission considers a transmission process of the optical beam from the transmitting end to the receiving end through the free space, and is inversely proportional to the square of a transmission distance; the ratio of receiving power of the optical fiber transceiving port at the receiving end describes a ratio of the optical power received by the single optical fiber transceiving port to the total receiving power of a user, and the ratio is proportional to the common area of an receiving light projection and the optical fiber transceiving port on a receiving plane; and the coupling efficiency of the optical fiber port is the ratio at which receiving light at the optical fiber port can be coupled into the optical fiber, and is proportional to the common area of an angular range of incident light at the optical fiber port and a receiving angle of the optical fiber port.

On the other hand, the FE-OWC method, where the communication method is the multi-user MIMO or massive MIMO optical wireless communication method implemented based on the FE-OWC system, and a specific communication process includes the following steps:

synchronization: the base station broadcasts a downlink synchronization signal, and the user terminals establish and maintain synchronization with the base station according to the received signal;

channel sounding: the user terminal transmits an uplink sounding signal, and the base station estimates channel information of each user terminal based on the received sounding signal;

downlink transmission: the base station uses the channel information of each user terminal and low rank property of the channel to perform precoding transmission and simultaneously transmits signals of all user terminals including pilot signals and data signals, and each user terminal estimates channel information based on the received pilot signals and uses the channel information to recover the data signals;

uplink transmission: the user terminal uses precoding transmission and simultaneously transmits signals including pilot signals and data signals to the base station, and the base station receives a signal superposition of all user terminals, estimates channel information of each user terminal based on the pilot signals, and uses low rank property of the channel to perform receiving processing and recover the data signals of each user terminal.

Furthermore, in the process of downlink transmission, the base station estimates an uplink channel from each user terminal to the base station through the uplink sounding process, uses reciprocity of the channel to obtain a downlink channel, decomposes a channel matrix into a product of a column vector and a row vector, calculates a received signal-to-interference-and-noise ratio and an achievable rate of each user terminal, and under a power constraint of a single optical fiber transceiving port, designs optimal linear precoding with the objective of maximizing the sum rate; or the base station uses a maximal ratio transmission (MRT) or regularized zero-forcing (RZF) precoding method based on the row vector in the channel matrix decomposition, uses precoding vectors to simultaneously transmit signals of all user terminals including pilot signals and data signals; and in the process of uplink transmission, the base station receives a signal superposition of all user terminals, estimates an uplink channel matrix of each user terminal based on the received pilot signals, decomposes the uplink channel matrix into a product of a column vector and a row vector, and designs an optimal linear receiver with the objective of maximizing the sum rate; or the base station uses a maximal ratio combining (MRC) receiver based on the column vector in the channel matrix decomposition, uses the linear receiver to detect received data signals and recover the transmitting signals of each user terminal.

Furthermore, in the process of downlink transmission, each user terminal estimates a downlink channel matrix based on the received pilot signals, decomposes the downlink transmission channel matrix into a product of a column vector and a row vector, and designs an optimal linear receiver with the objective of maximizing the sum rate, and the user terminal uses the optimal linear receiver to detect the received data signals; in the process of uplink transmission, each user terminal uses the reciprocity of the channel to obtain uplink channel information based on the downlink estimation, decomposes the channel matrix into a product of a column vector and a row vector, and under the total power constraint, designs a linear precoding vector with the objective of maximizing the sum rate, and the user terminal uses the precoding vector to transmit uplink signals including pilot signals and data signals.

On the other hand, the FE-OWC method, where the communication method is the beam division multiple access optical wireless communication method implemented based on the FE-OWC system; the beam division multiple access optical wireless communication method is that the base station allocates non-overlapping beams for different user terminals based on channel information of each user terminal, each beam transmits and receives signals of at most one user terminal, and optical beams of different directions simultaneously communicate with the user terminal bi-directionally; the user terminal selects beams in corresponding directions of the base station based on the channel information, and uses a single beam to communicate with a single base station; and a specific communication process includes the following steps:

synchronization: the base station broadcasts a downlink synchronization signal, and the user terminal establishes and maintains synchronization with the base station according to the received signals;

channel sounding: the user terminal transmits up link sounding signal, the base station allocates beams for each user terminal based on the received sounding signal, and communicates with user terminals by non-overlapping beams on the same time-frequency resource, where only one beam is allocated to each user;

downlink transmission: the base station transmits independent signals on the beam allocated for each user terminal according to the beam allocation result, and based on the received signals, each user terminal selects a beam corresponding to the base station to perform receiving detection; and uplink transmission: each user terminal transmits signals on a beam corresponding to the base station, and based on the beam allocation result, the base station receives and detects transmitting signals of each user terminal on the beam allocated for each user terminal.

Furthermore, in the process of downlink transmission, the base station transmits, based on the beam allocation result, a signal to each user terminal therefor, different beams transmit signals of different user terminals, a multi-user downlink transmission link is decomposed into a plurality of parallel single-user links, and the base station uses a baseband modulation mode to generate a user analog baseband transmitting signal; in the process of uplink transmission, the base station receives and detects a transmitting signal of each user terminal on the beam allocated for each user terminal based on the beam allocation result, the base station receives and detects signals of different user terminals by using different beams, the multi-user uplink transmission link is decomposed into a plurality of parallel single-user links; and the base station generates a digital baseband signal of each user terminal by using a baseband demodulation mode.

Furthermore, in the process of downlink transmission, each user terminal selects a beam corresponding to the base station based on the strength of a receiving signal, and uses the baseband demodulation mode to generate a digital baseband signal on a corresponding beam; in the process of uplink transmission, each user terminal uses the baseband modulation mode to generate an analog baseband signal on a beam corresponding to the base station.

Advantages: compared with the prior art, the present invention has the following beneficial effects:

1. In the present invention, a base station uses an optical antenna composed of an optical fiber transceiving port array and a lens or a reflecting mirror to generate a plurality or a large number of beams in different directions, different beams cover different areas, and the base station uses different beams to simultaneously communicate with a plurality or a large number of user terminals, thereby greatly improving the number of user terminals supported by the optical wireless communication.
2. The present invention uses ultra-high-rate data transmission supported by an optical fiber, thereby significantly improving a transmission rate of each user terminal link and system throughput.
3. The base station and the user terminal use an optical fiber transceiving port to transmit and receive signals, which may implement bi-directional communication and solve the limitation of one-way transmission in the optical wireless communication.
4. The base station uses the optical antenna to generate a plurality or a large number of beams in different directions, thereby implementing full-beam coverage of a communication area. When the user terminal is in the process of moving from one beam area to another beam area, the base station merely needs to switch the beam corresponding to the user terminal, and does not need a complex tracking system.
5. The base station uses different beams to communicate with different user terminals, and decomposes a multi-user transmission link into a plurality of single-user transmission links, where each single-user transmission link may use an optical modulation and optical demodulation (such as OOK modulation and demodulation) mode and may not need an A/D and a D/A equipment, thereby significantly reducing the implementation complexity of an ultra-high-rate optical wireless communication system.
6. The optical antenna is connected to the optical chain through an optical fiber; because the loss in the optical fiber transmission process is extremely low, the optical antenna may be flexibly arranged, and the optical antenna is a passive system with relatively low costs, such that system construction costs may be greatly reduced.
7. The optical antenna of the base station and the user terminal inputs a receiving optical signal into the optical fiber, then uses an optical fiber amplifier to amplify, and performs optical receiving processing, which may greatly improve the receiving capacity, such that transmission power of a transmitting end is reduced or a communication distance is increased.
8. The provided fiber enabled optical wireless communication method may efficiently construct a high-rate optical wireless communication system by using mature optical fiber communication technologies, devices, and equipment to meet the demands of mobile communication for improving transmission rate and system capacity level or multi-level in the future beyond 5G.
9. The provided fiber enabled optical wireless communication system may further be conveniently connected to an optical fiber communication network, to implement the extension of an optical fiber communication network to wireless coverage, thereby implementing mobile optical communication and all-optical communication supporting terminal mobility.

BRIEF DESCRIPTION OF THE DRAWINGS

FIG. 4A shows a single optical fiber transceiving port and FIG. 4B shows an optical fiber transceiving port array; FIG. 5A shows downlink transmission and FIG. 5B shows uplink transmission.

DETAILED DESCRIPTION OF THE EMBODIMENTS

To make the solutions of the present invention more comprehensible to those skilled in the art, the technical solutions in the embodiments of the present invention will be further described clearly and completely with reference to the accompanying drawings in the embodiments of the present invention. Obviously, the described embodiments are only a part of embodiments of the present invention, not all the embodiments. Based on the embodiments of the present invention, all other embodiments obtained by those of ordinary skill in the art without creative efforts shall fall within the protection scope of the present invention.

(1) System Architecture

Figure 1:
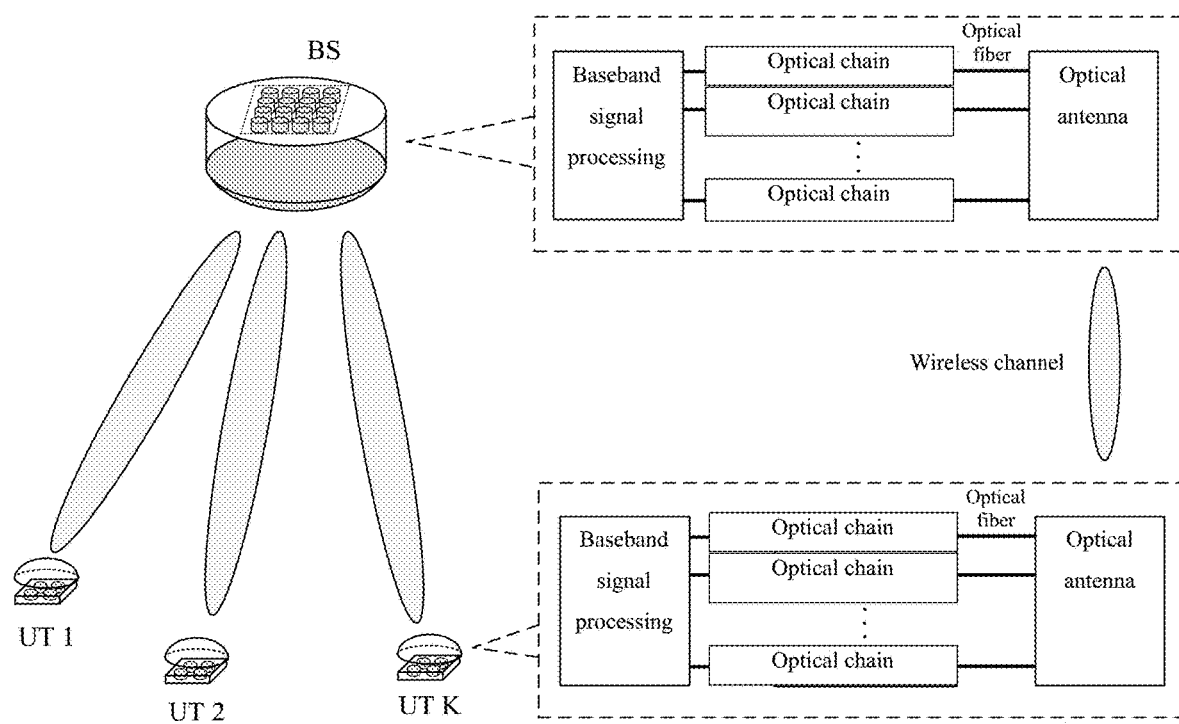
FIG. 1 is a schematic diagram of an architecture of a fiber enabled optical wireless communication system.

The present invention discloses a fiber enabled optical wireless communication (FE-OWC) system, and the system architecture of the FE-OWC system is as shown in FIG. 1. A single base station (BS) simultaneously serves K user terminals (UT), and both the base station and the user terminals are configured with an FE-OWC apparatus including an optical antenna, an optical chain, and a baseband signal processing unit. The optical antenna is connected to the optical chain through an optical fiber, and because the loss in the optical fiber transmission process is extremely low, the optical antenna may be flexibly arranged.

The optical antenna is used to transmit and receive an optical signal, which includes an optical fiber transceiving port array and a lens or a reflecting mirror. In the process of transmitting a signal, after light transmitted by a single optical fiber transceiving port is refracted by a lens or reflected by a reflecting mirror, an optical beam with a certain angular expansion is generated in a certain direction, light transmitted by different optical fiber transceiving ports is refracted or reflected in different directions, and the optical fiber transceiving port array and the lens or the reflecting mirror are used to generate a plurality of optical beams in different directions, thereby implementing full-beam coverage of a communication area, that is, optical beams generated by all optical fiber transceiving ports can cover the whole communication area. In the process of receiving a signal, receiving light in different directions is refracted by the lens or reflected by the reflecting mirror to different optical fiber transceiving port, coupled into an optical fiber and transmitted to an optical chain.

Figure 2:
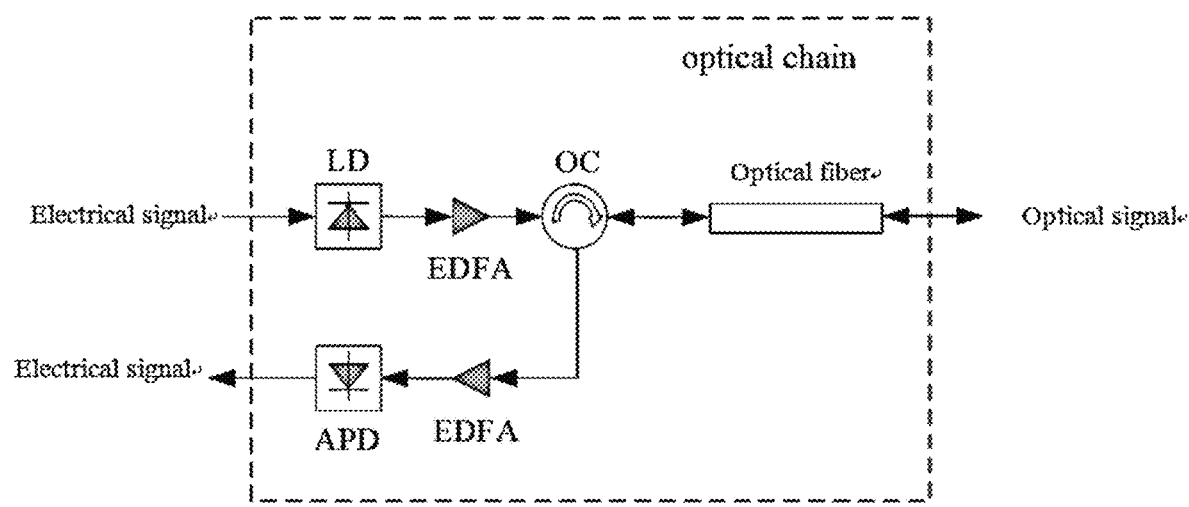
FIG. 2 is a schematic diagram of an optical chain.

The optical chain implements mutual conversion of an optical signal and an electrical signal, and the system architecture of the optical chain is as shown in FIG. 2. In the process of transmitting a signal, after an electrical signal is added with a bias current, a laser diode (LD) is driven to generate an optical signal corresponding to the electrical signal, and an external modulator may be also used, where an optical signal and an electrical signal generated by a laser source are input into the external modulator to generate the optical signal corresponding to the electrical signal. The optical signal is amplified by an optical amplifier such as an erbium-doped fiber amplifier (EDFA), and then transmitted to the optical antenna by the optical fiber. In the process of a receiving signal, an optical signal received by the optical antenna is transmitted to the optical chain by means of the optical fiber, and after being amplified by an optical amplifier, the optical signal is detected, such as its intensity, by using a photodetector, such as an avalanche photodiode (APD), and converted into a corresponding electrical signal. In addition, in the process of bi-directional transmission, an optical circulator (OC) is configured to separate optical signals in different directions.

The optical antenna is connected to the optical chain by means of an optical fiber directly, or an optical switching unit. When the optical antenna is directly connected to the optical chain, each optical chain corresponds to an optical fiber transceiving port, and the number of optical chains is the same as the number of optical fiber transceiving ports. When the optical antenna is connected to the optical chain by means of the optical switching unit, the number of optical chains is less than or equal to the number of optical fiber transceiving ports, and the optical switching unit is configured to switch a corresponding relationship between the optical chain and the optical fiber transceiving port, and correspond a signal in the optical chain to a beam generated by the optical antenna.

The baseband signal processing unit is configured to implement user scheduling, transceiving signal processing, and other functions. Specifically, the embodiments of the present invention disclose two baseband signal processing methods. In the first baseband signal processing method, a baseband signal processing unit includes an A/D module, a D/A module, and a digital baseband processing and control module, and multi-user multiple-input multiple-output (MIMO) or massive MIMO optical wireless communication is implemented between a base station and user terminals. In the process of downlink transmission, the digital baseband processing and control module at the base station side is configured to implement user scheduling and multi-user precoding transmission and generate a transmitting signal of each user terminal, and the D/A module is configured to convert the transmitting signal generated by the digital baseband processing and control module into an analog signal and input it into the optical chain; the A/D module at the user terminal side is configured to convert an electrical signal output by the optical chain into a digital signal, and the digital baseband processing and control module is configured to detect a receiving signal and recover the transmitting signal of the base station. In the process of uplink transmission, the digital baseband processing and control module at the user terminal side is configured to implement precoding transmission, and the D/A module is configured to convert the generated transmitting signal into an analog signal and input it into the optical chain; the A/D module at the base station side is configured to convert an electrical signal output by the optical chain into a digital signal, and the digital baseband processing and control module is configured to detect a multi-user receiving signal and recover the transmitting signal of each user terminal.

In the second baseband signal processing method, the baseband signal processing unit does not have an A/D module and a D/A module, and includes a baseband modulation module and a baseband demodulation module (such as on-off keying (OOK) modulation and demodulation), and a digital baseband processing and control module, and beam division multiple access (BDMA) optical wireless communication for a plurality of users or a large number of users is implemented between the base station and user terminals. in the process of downlink transmission, the digital baseband processing and control module at the base station side allocates non-overlapping beam sets for different user terminals and generate a digital baseband signal transmitted to each user terminal, the baseband modulation module is configured to generate an analog baseband signal transmitted to each user terminal, transmit it to a corresponding optical chain, and use a corresponding optical transceiving port to transmit; the baseband demodulation module at the user terminal side is configured to demodulate an analog baseband receiving signal output by the optical chain to generate a digital baseband signal, and the digital baseband processing and control module is configured to select an optical fiber transceiving port corresponding to the base station and recover a transmitting signal at the base station side based on the digital baseband signal received by the optical fiber transceiving port. in the process of uplink transmission, the digital baseband processing and control module at the user terminal side is configured to generate an uplink digital baseband transmitting signal, the baseband modulation module is configured to generate an analog baseband transmitting signal, transmit it to an optical chain, and use an optical fiber transceiving port corresponding to the base station to transmit; the baseband demodulation module at the base station side is configured to demodulate an analog baseband receiving signal output by the optical chain to generate a digital baseband signal, and the digital baseband processing and control module is configured to recover a transmitting signal of each user terminal based on a beam allocation result and the digital baseband signal on a beam corresponding to each user terminal.

(2) Optical Antenna Design

Figure 3:
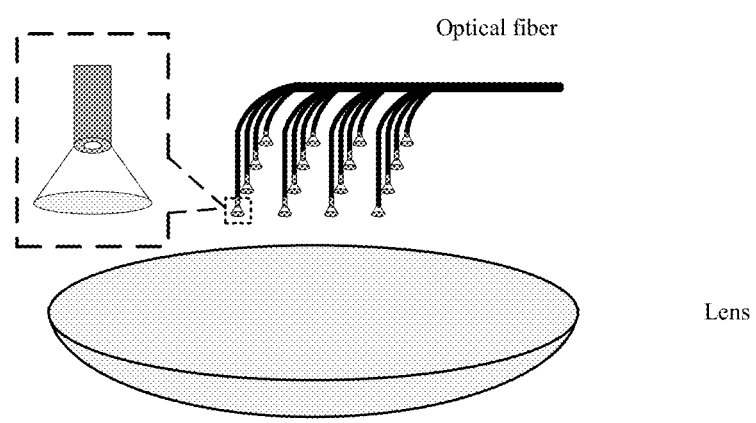
FIG. 3 is a schematic diagram of an optical antenna structure.

The optical antenna is composed of an optical fiber transceiving port array and a lens or a reflecting mirror. This embodiment takes as an example an optical antenna composed of an optical fiber transceiving port array and a lens, the structure of the optical antenna is shown in FIG. 3, and an optical antenna configured with a reflecting mirror can be obtained in a similar manner. Taking a single-mode optical fiber as an example, a corresponding design method may be applied to other optical fiber structures. Optical intensity transmitted by a single-mode optical fiber port approximately follows Gaussian distribution, and at a position with a radius of z from the center on a cross section at a propagation distance of r; optical intensity distribution may be modeled as:

$$I(r, z) = I_0(z) e^{\frac{-2r^2}{\omega_1^2(z)}} \quad (1)$$

where $I_0(z)$ represents the strongest optical intensity on the cross section at a distance of z, $\omega_1(z)=\omega_0\sqrt{1+(z/z_R)^2}$ represents a beam spot size on the cross section at a distance of z, $\omega_0$ is a waist width (z=0), $z_R=(\pi\omega_1^2(0))/\lambda$ is a Rayleigh distance, and $\lambda$ is a wavelength of light. The light transmitted by the optical fiber port is mainly concentrated in a range of beam spot $\omega_1(z)$.

To expand an angular range of the light transmitted and received by the optical fiber port, a micro-lens is configured at the optical fiber port to compose an optical fiber transceiving port. When a focal length of the micro-lens is f and a distance between the micro-lens and the optical fiber port is $d_1$, the intensity distribution of light transmitted by the optical fiber transceiving port may be expressed as:

$$I_1(r, z) = I_0(z) e^{\frac{-2r^2}{\omega_2^2(z)}} \quad (2)$$

where $\omega_2(z)$ is a beam spot size of the light transmitted by the optical fiber transceiving port at a position z, $$\omega_2^2(z) = \omega_0^2\left(1 - \frac{z-d_1}{f}\right)^2 + \omega_0^2\left(\frac{z}{z_R} - \frac{(z-d_1)d_1}{fz_R}\right)^2 \quad (3)$$

When a transmission distance z is much greater than the focal length f and $d_1$ of the lens, the angle of the light transmitted by the optical fiber transceiving port is extended as:

$$\tan(\theta_C) = \frac{\lambda}{\pi\omega_3} \quad (4)$$

where $\omega_3$ is $$\omega_3^2 = \frac{f^2\omega_1^2(0)}{(f-d_1)^2 + z_R^2} \quad (5)$$

in the above formula, $\theta_C$ describes the angular range of the light transmitted and received by the optical fiber transceiving port, and the angular range of a beam generated by the optical fiber transceiving port may be changed by adjusting the focal length f of the micro-lens and the distance $d_1$ between the micro-lens and the optical fiber port. To expand the angular extension of the beam, the distance $d_1$ should be reduced, that is, the micro-lens is arranged as close as possible to the optical fiber port. Therefore, in an angular range of $\theta_C$, the far-field intensity distribution of the beam generated by a single optical fiber transceiving port may be modeled as:

$$I(\theta, z) = \frac{4}{z^2\tan^2(\theta_C)} e^{\frac{-2\tan^2(\theta)}{\tan^2(\theta_C)}} U(\theta_C - \theta) \quad (6)$$

where $\theta$ is a polarizing angle relative to the Z axis and $U(\cdot)$ is a unit step function.

The optical antenna includes an optical fiber transceiving port array and a lens. For example, M optical fiber transceiving ports compose a square array or a circular array or a hexagonal array, etc., and a single lens covers the whole optical fiber transceiving port array, or a plurality of lenses together cover the whole optical fiber transceiving port array; different lenses cover different optical fiber transceiving ports, and the distance between the optical fiber transceiving port array and the lens is $d_2$. The center of the lens is taken as an origin to establish a rectangular coordinate system, and a coordinate of the ith optical fiber transceiving port is recorded as $(x_i, y_i, z_i)$, a horizontal distance is $r_i = \sqrt{x_i^2 + y_i^2}$, and a vertical coordinate is $z_i = -d_2$. The angle between the light transmitted by the ith optical fiber transceiving port and the vertical direction is $\varphi_i$, and after the light is refracted by the lens, the direction is $$\varphi_{i2} = -\frac{r_i}{F} + \left(1 - \frac{d_2}{F}\right)\varphi_i \quad (7)$$

where F is the focal length of the lens.

When $\varphi_i=0$, it represents that the direction of the central light transmitted by the optical fiber transceiving port after being refracted by the lens is $-r_i/F$ and is only related to the horizontal position of the optical fiber transceiving port; $(1-d_2/F)\varphi_i$ represents the relative angle between light having an angle of $\varphi_i$ in the vertical direction after being refracted by the lens and the refracted central light, and the relative angle is related to the vertical position of the optical fiber transceiving port. It can be seen from equation (6) that light transmitted by a single optical fiber transceiving port generates an optical beam with an angular extension of $\theta_C$, and after the optical beam is refracted by the lens, an optical beam with an angular range of $(1-d_2/F)\theta_C$ is generated in the $-r_i/F$ direction. Therefore, light transmitted by the single optical fiber transceiving port may generate an optical beam with a certain angular range in a certain direction after being refracted by the lens. If $\alpha=1-d_2/F$, the intensity distribution of the light with an angle of $\psi_i$ to the central light (a relative refraction angle) may be expressed as $$I_i(\psi_i)=T_{lens}I(\alpha^{-1}\psi_i, d_2) \quad (8)$$

where $T_{lens}$ represents lens gain.

To implement full-beam coverage of a communication area, an optical fiber transceiving port array and a lens are used, and by designing the horizontal position and vertical position of the optical fiber transceiving port array, a plurality or a large number of optical beams in different directions are generated to cover the whole communication area. Taking a square array composed of $M=\tilde{M}\times\tilde{M}$ optical fiber transceiving ports as an example, in the x axis and y axis directions, a maximum angular range of the communication coverage area is $\Theta$, adjacent beams overlap at the position where the maximum power declines to half, and the distance between the optical fiber transceiving port array and the lens is $$d_2 = F\left(1 - \frac{\Theta}{\tilde{M}\theta_{1/2}}\right) \quad (9)$$

where $\theta_{1/2}$ is the angular position at which the maximum power declines to half. Therefore, a coordinate of the ith optical fiber transceiving port can be obtained as $$x_i=(-(\tilde{M}-1)/2+m_1-1)d_a$$

$$y_i=(-(\tilde{M}-1)/2+m_2-1)d_a$$

$$i\ z_i=-d_2 \quad (10)$$

where $d_a$ is the distance between adjacent optical fiber transceiving ports, satisfying $d_a/F=2\Theta/\tilde{M}$, and $m_1$ and $m_2$ represent the $m_1$th row and $m_2$th column position in the square array, satisfying $i=(m_1-1)\tilde{M}+m_2$, $1\leq m_1$, $m_2\leq\tilde{M}$.

The optical fiber transceiving ports may also be arranged in a circular array or a hexagonal array; when the optical fiber transceiving ports are arranged in a circular array, the optical fiber transceiving ports are uniformly arranged at the center of a circle and on a circle with a radius of $r_c$, $2r_c$, etc., and by adjusting the radius of the circle and the interval of the optical fiber transceiving ports, the light transmitted by the optical fiber transceiving ports is enabled to be refracted by the lens so as to implement full-beam coverage of a receiving plane; and when the optical fiber transceiving ports are arranged in a hexagonal array, the optical fiber transceiving ports are arranged at the center, and at the position where the side length of the hexagon is $r_h$ and the hexagon is expanded outwards in a honeycomb structure, and by adjusting the side length of the hexagon, the light transmitted by the optical fiber transceiving ports is refracted by the lens, such that the full-beam coverage is implemented.

The full-beam coverage of the communication area can also be implemented by an optical fiber transceiving port array and a reflecting mirror. A single reflecting mirror covers the entire optical fiber transceiving port array, or a plurality of reflecting mirrors together cover the entire optical fiber transceiving port array. Based on the optical intensity distribution model (6) of a single optical fiber transceiving port, the process that the light transmitted from the optical fiber transceiving port at the position $(x_i, y_i, z_i)$ is reflected by a reflecting mirror is established by using geometric optics, so as to obtain the directions and angular ranges of the beams generated by the optical fiber transceiving ports at different positions after being reflected by the reflecting mirror. Based on the physical law of reflecting mirror reflection and the demand for full coverage of communication area, the position of an optical fiber transceiving port is designed, such that the light transmitted by the optical fiber transceiving port after being reflected by the reflecting mirror covers the whole communication area.

When the number of optical fiber transceiving ports is relatively large, the distance $d_2$ between the optical fiber transceiving port array and the lens tends to the focal length F of the lens, and the optical fiber transceiving port array is located at the focal plane of the lens. The light transmitted by different optical fiber transceiving ports is refracted to different directions by the lens, and illuminates different areas. When user terminals are located in different areas, optical intensities of light transmitted by a single optical fiber transceiving port to two user terminals are gradually orthogonal, $$\lim_{\tilde{M}\to\infty} I_i(\psi_{ik_1})I_i(\psi_{ik_2}) = 0 \quad (11)$$

where $\psi_{ik_1}$ and $\psi_{ik_2}$ are the relative refraction angles of user1 and user2 with respect to the ith optical fiber transceiving port. The single optical fiber transceiving port transmits signals of at most one user, and different user terminals receive optical signals from different optical fiber transceiving ports.

Figure 4A:
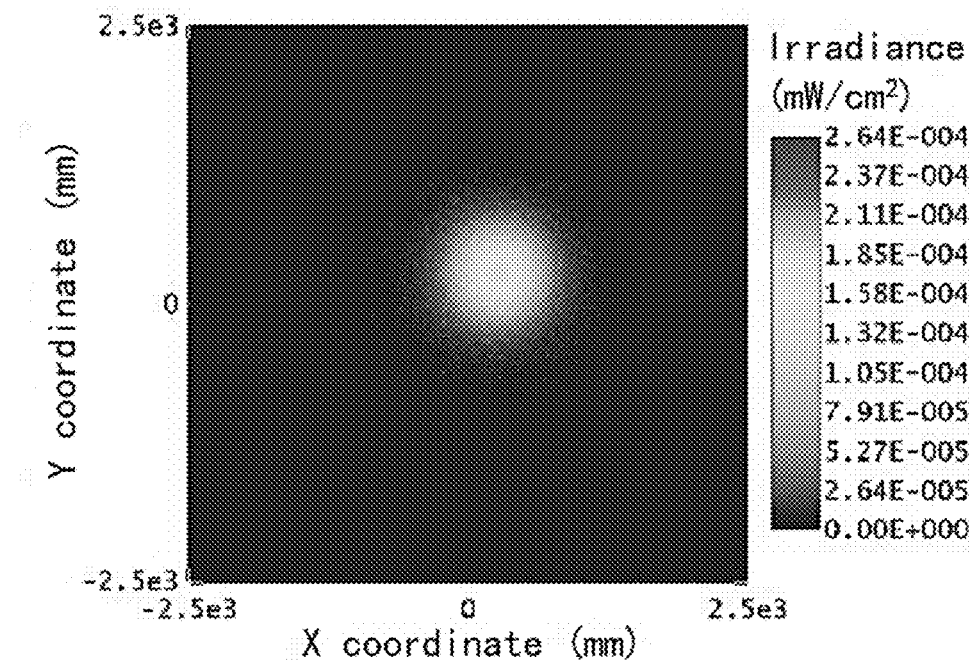
FIGS. 4A and 4B are schematic diagrams of a beam pattern.
Figure 4B:
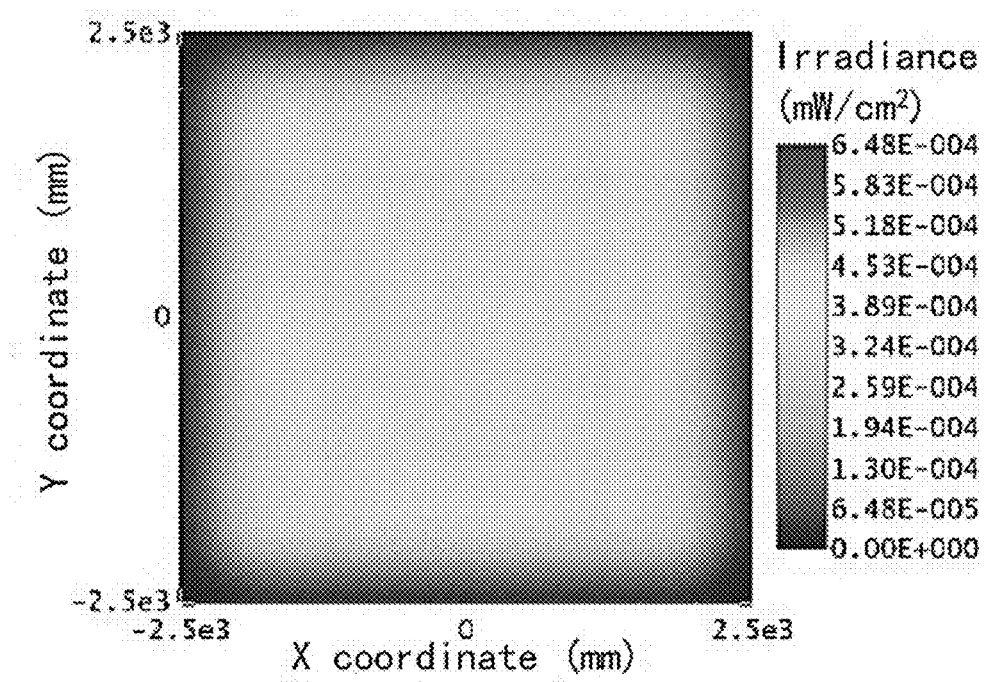

FIGS. 4A and 4B show a beam pattern generated by an 8×8 optical fiber transceiving port array on a receiving plane, and in a 5 m×5 m communication scenario with a height of 3 m, a base station is located in the center of the scenario. FIG. 4A shows a beam pattern generated by a single optical fiber transceiving port in an optical fiber transceiving port array, that is, the distribution of optical intensity on a receiving plane, and after being refracted by a lens, light transmitted by the single optical fiber transceiving port converges to a certain area to form a beam; FIG. 4B shows the beam pattern generated by the optical fiber transceiving port array, and different optical fiber transceiving ports generate beams in different directions, so that the beams of 8×8 are used to implement full-beam coverage of the whole communication area.

(3) Link Budget and Channel Model

Based on the above FE-OWC system, a link budget of single link transmission is considered, and a complete channel model for uplink transmission and downlink transmission is established. First, taking the process of downlink transmission as an example, the link budget from a base station to a user terminal is calculated and includes four parts: electro-optic conversion at a transmitting end, optical wireless channel gain, optical-electro conversion at a receiving end, and electrical noise at the receiving end. On this basis, a downlink transmission channel model is established, channel properties thereof are analyzed, and the process of uplink transmission is similar to that of downlink transmission, so that an uplink transmission channel model may be established in a similar manner.

At the transmitting end, electro-optic conversion converts an electrical signal into a corresponding optical signal by directly changing a drive current of a laser diode, or by an external modulator. When the drive current of the laser diode is changed directly and the drive current is higher than the threshold $I_{th}$, there is a linear relationship between output optical power and an input current. Therefore, when a bias current $I_B(I_B>I_{th})$ is added to an electrical signal x bearing information and then the electrical signal is input into a laser diode, the output optical intensity in the linear range may be expressed as $$P_{LD}=P_{LD,0}(1+mx) \quad (12)$$

where $P_{LD,0}$ is the optical power output driven by the bias current, and m is a conversion coefficient of optical intensity and input current. The optical signal output by the laser diode is transmitted after being amplified by an optical amplifier. If the gain of the optical amplifier is G, the output optical intensity is $$P_{out}=P_o^d(1+mx) \quad (13)$$

where $P_o^d=GP_{LD,0}$.

The optical wireless channel gain describes wireless transmission channel gain from an optical fiber port at the base station side to an optical fiber port at the user terminal side, and includes four parts: beam modeling at the transmitting end, channel gain of free space transmission, a ratio of receiving power of the optical fiber transceiving port at the receiving end, and coupling efficiency of the optical fiber port. The beam modeling at the transmitting end has been discussed in the optical antenna design, and when the angle between the kth user terminal and the central light of the ith optical fiber transceiving port at the base station is $\psi_{ik}^d$, the intensity distribution of the light transmitted by the optical fiber port light is given by equation (8) $I_i(\psi_{ik}^d)$. From the ith optical fiber transceiving port at the base station side to the lens at the kth user terminal, the wireless channel gain $g_{ik}^d$ is $$g_{ik}^d=A_k\beta^d(d_k)\cos(\phi_k^d)I_i(\psi_{ik}^d) \quad (14)$$

where $A_k$ represents the area of the lens at the kth user terminal side, $\phi_k^d$ is the incident angle of the light at the user terminal side, $d_k$ is the distance from the base station to the user terminal, $\beta^d(d_k)$ describes channel attenuation caused by transmission distance $d_k$, and based on the energy conservation law in light transmission, it can be calculated $$\beta^d(d_k) = \frac{d_2^2}{d_k^2\alpha^2}(1-e^{-2})^{-1} \quad (15)$$

The channel attenuation is inversely proportional to the square of the transmission distance, and is also inversely proportional to $\alpha^2$, $\alpha$ describes the angular extension change of the beam being refracted by the lens, and when $\alpha$ is small, that is, the beam is concentrated in a small angular range, the channel gain is relatively large.

At the user terminal side, receiving light is received by the optical fiber transceiving port after being refracted by the lens. When the incident angle of the incident light is $\tilde{\phi}$ and the incident position is $\tilde{x}$, after the light is refracted by the lens and transmitted in the free space for a distance of $\tilde{z}$, the angle and the position on the receiving plane are $$\tilde{x}_2=(1-\tilde{z}/\tilde{F})\tilde{z}+\tilde{z}\tilde{\phi}$$

$$\tilde{\phi}_2=\tilde{\phi}-\tilde{x}/\tilde{F} \quad (16)$$

where $\tilde{F}$ is the focal length of the lens at the user terminal side. The illuminated area of the incident light with the incident angle of $\tilde{\phi}$ on the receiving plane is $$\mathcal{A}_C = \left\{(\tilde{x},\tilde{y}) \middle| \begin{array}{c} -\tilde{r}_{lens}+\tilde{z}(\tilde{\phi}+\tilde{r}_{lens}/\tilde{F}) \leq \tilde{x} \leq \tilde{r}_{lens}+\tilde{z}(\tilde{\phi}-\tilde{r}_{lens}/\tilde{F}) \\ -\sqrt{\tilde{y}(\tilde{x})} \leq \tilde{y} \leq \sqrt{\tilde{y}(\tilde{x})} \end{array}\right\} \quad (17)$$

where $\tilde{r}_{lens}$ is the radius of the lens at the user terminal side, and $\tilde{y}(\tilde{x})$ is calculated by the following equation $$\tilde{y}(\tilde{x}) = \left(\frac{\tilde{F}-\tilde{z}}{\cos(\tilde{\phi})}-(\tilde{x}-\tilde{z}\tilde{\phi})\tilde{\phi}\right)^2\left(\frac{\tilde{r}_{lens}}{\tilde{F}}\right)^2-(\tilde{x}-\tilde{z}\tilde{\phi})^2\cos^2(\tilde{\phi}) \quad (18)$$

The power of a single optical fiber transceiving port receiving light is proportional to the irradiated area of the receiving light on the receiving plane and the common area of the optical fiber transceiving port, and if the area of the jth optical fiber transceiving port is $\mathcal{A}_j$, then the ratio of the power of the jth optical fiber transceiving port receiving light is $$\gamma_{kj}^d = \frac{\int_{\mathcal{A}_C \cap \mathcal{A}_j} d\mathcal{A}}{\int_{\mathcal{A}_C} d\mathcal{A}} \quad (19)$$

If the optical antenna includes an optical fiber transceiving port array and a reflecting mirror, using geometric optics principle to analyze illumination area of the receiving light on the receiving plane when incident light is incident on the reflecting mirror at an angle of $\tilde{\phi}$ and reflected by the reflecting mirror, the power of a single optical fiber transceiving port receiving light is proportional to the irradiated area of the receiving light on the receiving plane and the common area of the optical fiber transceiving port.

Considering the coupling efficiency of the optical fiber port, the optical fiber port is installed with a micro-lens to expand the beam angle to be $\theta_C$, and based on the reversibility of light transmission, light within the angle of $\theta_C$ may be coupled into the optical fiber for transmission, so that the receiving angle of the optical fiber port is $$\Omega_f=\{0\leq\Xi\leq 2\pi,\ 0\leq\theta\leq\theta_C\} \quad (20)$$

where $\Xi$ represents the receiving angle in the horizontal direction and $\theta$ represents the receiving angle in the vertical direction. After the incident light is refracted by the lens, the angular range $\Omega_s$ of the incident light at the optical fiber port can be calculated as $$\Omega_s = \left\{0 \leq \Xi \leq 2\pi, 0 \leq \theta \leq \cos^{-1}\left(\frac{\tilde{F}\cos(\tilde{\phi})+\tilde{r}\cos(\alpha)\sin(\tilde{\phi})}{\sqrt{\tilde{F}^2+\tilde{r}^2}}\right)\right\} \quad (21)$$

The coupling coefficient $\eta_k^d$ is the ratio of the volume of the common area of $\Omega_f$ and $\Omega_s$ to the volume of the $\Omega_s$ region, and can be represented as $$\eta_k^d = \frac{\int_{\Omega_f \cap \Omega_s} d\Omega}{\int_{\Omega_s} d\Omega} \quad (22)$$

Concluding the above four parts, the wireless optical transmission channel gain from the ith optical fiber port at the base station side to the jth optical fiber port of the kth user terminal can be obtained as $$g_{ikj}^d = \eta_k^d \gamma_{kj}^d g_{ik}^d \quad (23)$$

Then considering the optical-electro conversion process at the receiving end, the received optical signal is first amplified by an optical amplifier, and then an optical-electro detector is used to convert the optical signal into the corresponding electrical signal. When the power of the received optical signal is $P_1$ and the gain of the optical amplifier is G, the output power of the optical amplifier is $GP_1$. The optical signal output by the optical amplifier is converted into a corresponding electrical signal by the optical-electro detector (such as an avalanche diode), the amplification factor of the optical-electro detector is $M_p$, and the responsivity of the optical-electro detector is $\mathcal{R}$, so that the electrical signal output by the optical-electro detector is $M_p \mathcal{R} GP_1$.

Combining the electro-optic conversion, the optical wireless channel gain, and optical-electro conversion at the receiving end, the electrical signal transmission channel gain from the ith optical fiber transceiving port at the base station to the jth optical fiber transceiving port of the kth user terminal can be expressed as $$h_{ikj}^d = M_p \mathcal{R} G g_{ikj}^d P_o^d m \quad (24)$$

A relationship between the electrical signal $x_i^d$ transmitted by the ith optical fiber transceiving port of the base station to the electrical signal $y_{kj}$ received by the jth optical fiber transceiving port of the kth user terminal is $$y_{kj} = h_{ikj}^d x_i^d + n_p \quad (25)$$

where $n_p$ is noise mainly including shot noise of the optical-electro detector and beat noise mixing the signal with amplified spontaneous emission noise, and the variance thereof can be expressed approximately as $$\sigma_p^2 = 2q\mathcal{R} \, G^2 g_{ikj}^d P_o^d B_e M_p^2 F(M_p) NF \quad (26)$$

where q is electron charge, $B_e$ is bandwidth of the electrical signal, $F(M_p)$ is a noise coefficient of the optical-electro detector, and NF is a noise coefficient of the optical amplifier. Therefore, the receiving signal-to-noise ratio of the single link can be calculated as $$SNR_{ikj}^d = \frac{\mathcal{R} g_{ikj}^d P_o^d m^2 \sigma_x^2}{2q B_e F(M_p)} \frac{1}{NF} \quad (27)$$

where $\sigma_x^2$ is power of the transmitting signal.

After the single link transmission channel model from the base station to the user terminal and the signal-to-noise ratio of the single link are established, the complete channel model from the base station to the user terminal is considered below. The base station is configured with M optical fiber transceiving ports, and the user terminal is configured with N optical fiber transceiving ports, so that the electrical signal transmission channel matrix from the base station to the kth user terminal is $H_k^d$, and the (j, i)th element thereof is $[H_k^d]_{j,i} = h_{ikj}^d$. From equation (23), the optical wireless transmission channel gain $g_{ikj}^d$ may be decomposed as $g_{ikj}^d = \eta_k^d \gamma_{kj}^d g_{ik}^d$, and thus the channel matrix $H_k^d$ may be decomposed as $H_k^d = b_k^d (g_k^d)^T$, where $b_k^d = M_p \mathcal{R} \, GP_o^d m \eta_k^d [\gamma_{k1}^d, \gamma_{k2}^d, \ldots, \gamma_{kN}^d]^T$, $g_k^d = [g_{1k}^d, g_{2k}^d, \ldots, g_{Mk}^d]^T$, and $[\cdot]^T$ represent transpose operation, and the result indicates that the channel matrix has a rank of 1 and exhibits a low-rank property.

The channel model for uplink transmission is similar to the channel model for downlink transmission. When the base station and the user terminal use the same transceiving device in the process of uplink transmission and downlink transmission, the electro-optic conversion and optical-electro conversion processes of uplink transmission and downlink transmission are consistent, and only the transmitting power of the user terminal and the optical wireless transmission channel gain are different. In the process of uplink transmission, the transmitting power at the user terminal side is $P_o^u$, the intensity distribution of the light transmitted by the jth optical fiber transceiving port of the kth user terminal can be similarly modeled as $I_{kj}(\psi_{kj}^u)$, where $\psi_{kj}^u$ is the relative refraction angle from the user to the base station, so that the channel gain from the jth optical fiber transceiving port of the kth user terminal to the lens at the base station side can be modeled as $$g_{kj}^u = A\beta^u(d_k)\cos(\phi_k^u) I_{kj}(\psi_{kj}^u) \quad (28)$$

where A is the area of the lens at the base station side, $\beta^u(d_k)$ represents the channel attenuation caused by transmission distance $d_k$, and $\phi_k^u$ is the incident angle at the base station. When the power coefficient of the signal of the kth user in the uplink transmission being coupled into the ith optical fiber transceiving port of the base station is $\gamma_{ik}^u$, and the coupling efficiency into the optical fiber port is $\eta_k^u$, the optical transmission channel gain is $g_{ikj}^u = \eta_k^u \gamma_{ik}^u g_{jk}^u$. Therefore, the complete electrical signal transmission channel matrix from the kth user terminal to the base station is $H_k^u$, the (i,j)th element thereof is $[H_k^u]_{i,j} = M_p \mathcal{R} \, G g_{ikj}^u P h d \, o^u m$. Likewise, the uplink transmission channel matrix $H_k^u$ may be decomposed into $H_k^u = b_k^u (g_k^u)^T$, where $b_k^u = M_p \mathcal{R} \, GP_o m \eta_k^u [\gamma_{1k}^u, \gamma_{2k}^u, \ldots, \gamma_{Mk}^u]^T$, $g_k^u = [g_{k1}^u, g_{k2}^u, \ldots, g_{kN}^u]^T$. Therefore, the rank of the uplink transmission channel matrix is 1.

Due to the reversibility of light transmission, the channel path of uplink transmission and the channel path of downlink transmission are reciprocal, that is, in the downlink transmission, the kth user terminal receives a signal of the ith optical fiber transceiving port of the base station, and in the process of uplink transmission, the ith optical fiber transceiving port of the base station receives a transmitting signal of the kth user terminal; likewise, at the user terminal side, in the downlink transmission, the jth optical fiber transceiving port of the user receives the signal of the base station, and in the uplink transmission, the base station receives the signal transmitted by the jth optical fiber transceiving port.

(4) Multi-User MIMO or Massive MIMO Optical Wireless Communication Method

In the FE-OWC system, a base station uses a plurality (several to several tens) or a large number (hundreds to thousands) of beams to bi-directionally communicate with a plurality or large number of user terminals. When the receiving end and the transmitting end are configured with A/D modules and D/A modules that correspond to the optical chains, the digital baseband processing thereof can realize uplink and downlink multi-user MIMO (MU- MIMO) transmission, thereby implementing multi-user MIMO optical wireless communication. Further, when the base station side is configured with a large number of optical chains and optical fiber transceiving ports, the base station may communicate with a large number of user terminals simultaneously and to implement massive MIMO (massive MIMO) optical wireless communication. From the perspective of digital baseband processing, the multi-user MIMO or massive MIMO communication process includes the following four steps: synchronization, channel sounding, downlink transmission, and uplink transmission. 1) The base station broadcasts a downlink synchronization signal, and the user terminal establishes and maintains synchronization with the base station according to the received signal. 2) The user terminal transmits an uplink sounding signal, and the base station estimates channel information of each user terminal based on the received sounding signal. 3) The base station uses the channel information of each user terminal and low rank property of the channel to perform precoding transmission and simultaneously transmits signals of all user terminals including pilot signals and data signals, and each user terminal estimates channel information based on the received pilot signals and uses the channel information to recover the data signals. 4) The user terminal uses precoding to simultaneously transmit signals including pilot signals and data signals to the base station, and the base station receives a signal superposition of all user terminals, estimates channel information of each user terminal based on the pilot signals, and uses low rank property of the channel to perform receiving processing and recover the data signals of each user terminal. The downlink and uplink transmission processes will be described in detail below.

Downlink Transmission

In the process of downlink transmission, a base station simultaneously transmits K signals of a user terminal, and a signal transmitted by the ith optical fiber transceiving port to the kth user terminal is recorded as $x_{ki}^d$, and then a signal transmitted by the base station to the kth user terminal is recorded as $X_k^d = [x_{k1}^d, x_{k2}^d, \ldots, x_{kM}^d]^T$. The receiving signal of the kth user terminal can be expressed as $$y_k = \sum_{k'} H_k^d x_{k'}^d + n_k \tag{29}$$

where $H_k^d$ represents the electrical signal transmission channel gain from the base station to the kth user terminal, $n_k$ is Gaussian noise and the mean value thereof is zero, covariance matrix is diagonal matrix $\Lambda_k$, and the (j,j)th diagonal element is $$[\Lambda_k]_{j,j} = 2q\mathcal{R}G^2 \sum_i g_{ikj}^d P_o^d B_e M_p^2 F(MP)NF.$$

The base station estimates uplink channel information based on the received sounding signal in the process of channel sounding, and uses the reciprocity of the downlink channel and the uplink channel to obtain a downlink channel matrix. The rank of the channel matrix from the base station to a single-user terminal is 1, and the channel matrix $H_k^d$ may be decomposed into the form of a product of a column vector and a row vector, that is, $H_k^d = b_k^d (g_k^d)^T$. The signal $x_k^d$ transmitted by the base station to the kth user terminal is generated by the independently and identically distributed data symbols $s_k^d$ by means of linear precoding $w_k^d$. The kth user terminal uses, based on the received signal, a linear receiver $a_k^d$ to detect a data signal, that is, $r_k^d = (a_k^d)^T y_k^d$, and then in downlink transmission, the received signal-to-interference-and-noise ratio of the kth user terminal is $$SINR_k^d = \frac{((a_k^d)^T b_k^d)^2 ((g_k^d)^T w_k^d)^2}{((a_k^d)^T b_k^d)^2 \sum_{k' \neq k} ((g_k^d)^T w_{k'}^d)^2 + (a_k^d)^T \Lambda_k a_k^d} \tag{30}$$

When the transmitting signal $s_k^d$ is uniformly distributed with zero-mean unit variance, the achievable rate is expressed as $$R^d = \frac{1}{2} \sum_k \log(1 + \kappa SINR_k^d) \tag{31}$$

where $\kappa = 6/(\pi e)$. Under the power constraint of a single optical fiber transceiving port, the problem of maximizing the system sum rate can be expressed as $$\max_{w_k, a_k} R^d \tag{32}$$

$$\text{s.t.} \sum_k e_i^T w_k^d (w_k^d)^T e_i \leq p^d$$

$$(a_k^d)^T a_k^d = 1$$

where $e_i = [0, \ldots, 0, 1, 0, \ldots, 0]^T$ is the unit vector, only the ith element is 1, the rest elements are 0, and $P^d$ is the power constraint of a single optical fiber transceiving port at the base station side.

The above optimal linear receiver for maximizing the system sum rate is $$a_k^d = \frac{\Lambda_k^{-1} b_k^d}{\|\Lambda_k^{-1} b_k^d\|_2} \tag{33}$$

The optimal linear precoding is $$w_k^d = \left( \sum_j a_j \tilde{g}_j \tilde{g}_j^T + D \right)^{-1} b_k \tilde{g}_k \tag{34}$$

where $\tilde{g}_k = g_k^d \sqrt{(b_k^d)^T \Lambda_k^{-1} b_k^d}$, coefficients $a_j$ and $b_k$ are respectively $$a_j = \left( 1 + \sum_{k' \neq j} (\tilde{g}_j^T w_{k'}^d)^2 + \kappa (\tilde{g}_j^T w_j^d)^2 \right)^{-1} \left( 1 + \sum_{k' \neq j} (\tilde{g}_j^T w_{k'}^d)^2 \right)^{-1} \kappa (\tilde{g}_j^T w_j^d)^2 \tag{35}$$

$$b_k = \kappa \tilde{g}_k^T w_k^d \left( 1 + \sum_{k' \neq k} (\tilde{g}_k^T w_{k'}^d)^2 + \kappa (\tilde{g}_k^T w_k^d)^2 \right)^{-1}$$

$$\left( 1 + \sum_{k' \neq k} (\tilde{g}_k^T w_{k'}^d)^2 \right)^{-1} \left( 1 + \sum_{k'} (\tilde{g}_k^T w_{k'}^d)^2 \right)$$

and the diagonal matrix D is an auxiliary matrix to enable the precoding vector to meet the constraint. The optimal linear precoding may be obtained by the following calculation:

Step 1, initialize the precoding vector $(w_k^d)^{(0)}$ and the diagonal matrix $D^{(0)}$, calculate an initial value of sum rate $(R^d)^{(0)}$ based on equation (31), and set an iteration indication i=1.

Step 2, calculate coefficients $a_j$ and $b_k$ based on equation (35).

Step 3, update precoding vector $(w_k^d)^{(i)}$ based on equation (34), and calculate sum rate $(R^d)^{(i)}$.

Step 4, calculate a difference $\Delta = \text{diag}((w_k^d)^{(i)}((w_k^d)^{(i)})^T) - p^d$ between the power constraints, where $\text{diag}(\cdot)$ represents a column vector composed of diagonal elements.

Step 5, if , and $\|\Delta\| \le \epsilon$, and $\epsilon$ is an error threshold, stop the iteration; otherwise, update $D^{(i)} = D^{(i-1)} + t\Delta$, where t is the update step size, set i=i+1, and return to step 2.

When the above iterative algorithm is stopped, the optimal precoding vector $w_k^d$ can be obtained. Therefore, in the downlink transmission of fiber enabled optical wireless communication, the base station uses the precoding vector $w_k^d$ to transmit a signal to the kth user terminal, and the kth user terminal uses a linear receiving vector $a_k^d$ to detect the received signal, so as to recover data signal transmitted by the base station.

Uplink Transmission

In the uplink transmission process of fiber enabled optical wireless communication, the user terminal uses the channel reciprocity to obtain the uplink channel information through downlink channel estimation, and designs linear precoding to transmit independent signals, and the base station receives the superposition of the signals transmitted by the user terminal. $x_k^u$ is denoted as the uplink signal transmitted by the kth user terminal, which can be represented as $x_k^u = w_k^u s_k^u$, where $w_k^u$ is the precoding vector at the user side, and $s_k^u$ is the transmitting signal of the kth user terminal. Then the transmitting signal at the base station side can be expressed as $$y = \sum_k H_k^u x_k^u + z \qquad (36)$$

where $H_k^u$ is the uplink transmission electrical signal gain from the kth user terminal to the base station, and can be decomposed into the form of a product of a column vector and a row vector, that is, $H_k^u = b_k^u (g_k^u)^T$ whose rank is 1, z is electrical signal noise at the base station side and the mean value is 0, covariance matrix is diagonal matrix $\Lambda$, and the (i, i)th element is $$[\Lambda]_{i,i} = 2q\mathcal{R}G^2 \sum_k \sum_j g_{ikj}^u P_o^u B_e M_p^2 F(M_p) NF.$$

The base station uses, based on a received signal, a linear receiver $a_k^u$ to detect a transmitting signal of the kth user terminal, that is, $$r_k^u = (a_k^u)^T b_k^u (g_k^u)^T w_k^u s_k + (a_k^u)^T \sum_{k' \ne k} b_{k'}^u (g_{k'}^u)^T w_{k'}^u s_{k'} + (a_k^u)^T z \qquad (37)$$

and then a received signal-to-interference-and-noise ratio of the kth user terminal is $$SINR_k^u = \frac{((a_k^u)^T b_k^u)^2 ((g_k^u)^T w_k^u)^2}{\sum_{k' \ne k} ((a_k^u)^T b_{k'}^u)^2 ((g_{k'}^u)^T w_{k'}^u)^2 + (a_k^u)^T \Lambda a_k^u} \qquad (38)$$

The system sum rate in the uplink transmission is $$R^u = \frac{1}{2} \sum_k \log(1 + \kappa SINR_k^u) \qquad (39)$$

Under the total power constraint, the optimal precoding and the linear receiver are designed to maximize the system sum rate in the uplink transmission, and the problem can be expressed as $$\max_{a_k^u, w_k^u} R^u \qquad (40)$$

$$\text{s.t. } (w_k^u)^T w_k^u \le p^u$$

$$(a_k^u)^T a_k^u = 1$$

where $p^u$ is the power constraint for each user terminal in uplink transmission. Under the above power constraint, the optimal precoding vector that maximizes the system sum rate in the uplink transmission is $$w_k^u = \sqrt{c_k} \frac{g_k^u}{\|g_k^u\|_2} \qquad (41)$$

The optimal linear receiver is $$a_k^u = \frac{\left(\sum_{k' \ne k} c_{k'} b_{k'}^u (b_{k'}^u)^T + \Lambda\right)^{-1} b_k^u}{\left\|\left(\sum_{k' \ne k} c_{k'} b_{k'}^u (b_{k'}^u)^T + \Lambda\right)^{-1} b_k^u\right\|_2} \qquad (42)$$

where $c_k$ is an auxiliary variable related to the transmission power of the kth user terminal. When $c_k \ne 0$ or $c_k \ne \|g_k^u\|_2^2 p^u$, $c_k$ satisfies $$\kappa (b_k^u)^T \left(\Lambda + \kappa c_k b_k^u (b_k^u)^T + \sum_{k' \ne k} c_{k'} b_{k'}^u (b_{k'}^u)^T\right)^{-1} (b_k^u) = \qquad (43)$$

$$\sum_{i \ne k} (b_i^u)^T \left(\left(\Lambda + \sum_{k' \ne i} c_{k'} b_{k'}^u (b_{k'}^u)^T\right)^{-1} - \right.$$

$$\left. \left(\Lambda + c_i b_i^u (b_i^u)^T + \sum_{k' \ne i} c_{k'} b_{k'}^u (b_{k'}^u)^T\right)^{-1}\right)(b_k^u)$$

The optimal linear precoding and the linear receiver can be obtained by the following calculation:

Step 1, initialize $c_k \|g_k^u\|_2^2 p^u$, calculate the precoding vector and the receiving vector based on equations (41) and (42), and calculate the sum rate $R^u$ in the uplink transmission by using equation (39), and set k=1.

Step 2, given the values $c_i$ of other user terminals, calculate the value of $c_k$ based on equation (43), update the precoding vector and the receiver vector based on equations (41) and (42), and calculate the uplink transmission sum rate $R^{(k)}$ by using equation (39).

Step 3, if $R^{(k)} > R^u$, update $R^u = R^{(k)}$, and set $c_k$ as the calculation result based on equation (43); otherwise, keep $c_k$ unchanged.

Step 4, set $k = k + 1$, and if $k \leq K$, return to step 2; otherwise, stop the iteration.

By means of the above calculation, the optimal value $c_k$ of each user terminal may be obtained, and the precoding vector $w_k^u$ and the receiver vector $a_k^u$ are calculated based on equations (41) and (42). In the uplink transmission of fiber enabled optical wireless communication, the kth user terminal uses a precoding vector $w_k^u$ to transmit a signal to a base station, and the base station uses a linear receiving vector $a_k^u$ to detect the signal of the kth user terminal.

Taking an exemplary example of designing the optimal linear precoding and optimal linear receiver with the objective of maximizing the system sum rate, the base station may also use, based on the row vector in the channel matrix decomposition, precoding methods such as maximal ratio transmission (MRT) or regularized zero forcing (RZF) to perform precoding design, and may also use a maximal ratio combining (MRC) receiver based on the column vector in the channel matrix decomposition of each user, and details are not described herein again.

(5) Beam Division Multiple Access (BDMA) Optical Wireless Communication

To reduce the system construction costs, the transceiving end of the FE-OWC system may not be configured with a broadband A/D module and a broadband D/A module that correspond to an optical chain, and in this case, the base station may implement beam division multiple access (BDMA) communication with a plurality of user terminals or a large number of user terminals. It should be noted that even if the transceiving end is not configured with a broadband A/D module and a broadband D/A module, in order to implement effective control of the communication process, the system may be configured with an A/D module and a D/A module of an appropriate bandwidth, and at the same time, even if the transceiving ends are configured with the broadband A/D module and the broadband D/A module, a BDMA communication method may still be used to reduce the complexity of digital baseband processing. The fiber enabled beam division multiple access optical wireless communication method is that: the base station allocates non-overlapping beams for different user terminals based on channel information of each user terminal, each beam transmits and receives signals of at most one user terminal, and optical beams in different directions are simultaneously used to communicate with the user terminal bi-directionally; the user terminal selects beams in corresponding direction of the base station based on the channel information, and uses a single beam to communicate with a single base station. The specific communication process includes the following four steps: synchronization, channel sounding, downlink transmission, and uplink transmission. 1) The base station broadcasts a downlink synchronization signal, and the user terminal establishes and maintains synchronization with the base station according to the received signal. 2) The user terminal transmits an uplink sounding signal, the base station allocates beams for each user terminal based on the received sounding signal, users communicating with the base station on the same time-frequency resource are allocated beams that do not overlap with each other, and only one beam is allocated to each user. 3) In the process of downlink transmission, the base station transmits independent signals on the beam allocated for each user terminal based on the beam allocation result, and based on the received signals, each user terminal selects a beam corresponding to the base station to perform receiving detection. 4) In the process of uplink transmission, each user terminal transmits a signal on a beam corresponding to the base station, and based on the beam allocation result, the base station receives and detects a transmitting signal of each user terminal on the beam allocated for each user terminal. The downlink and uplink transmission processes are specifically:

Downlink Transmission

In the process of fiber enabled beam division multiple access downlink transmission, the base station allocates non-overlapping beams to different user terminals, and transmits the signal to different user terminals by using different beams. When the beam allocated to the kth user terminal by the base station is $i_k$, the precoding vector of the signal transmitted by the kth user terminal is $w_k^d = p^d e_{i_k}$, where $e_i$ is a unit vector, the ith element thereof is 1, and the rest elements are 0. The beams allocated to different user terminals by the base station do not overlap each other, and therefore the precoding vectors of different user terminals are orthogonal to each other, that is, $(w_{k_1}^d)^T w_{k_2}^d = 0$. In this case, the base station on the $i_k$th beam transmits a signal with power of p to the kth user terminal. The user terminal selects, based on the strength of the receiving signal, a beam corresponding to the base station to receive, that is, the receiving vector is $a_k^d = e_{j_k}$, where $j_k$ represents an optical fiber transceiving port corresponding to the base station at the kth user terminal side.

In the beam division multiple access downlink transmission, the base station selects different transmitting beams to transmit signals of different user terminals, and the user terminals select beams corresponding to the base station to receive signals, so that a multi-user downlink transmission link may be decomposed into a plurality of parallel single-user links The base station may use a baseband modulation (such as OOK modulation) mode to generate a user analog baseband transmitting signal, and the user terminal selects a beam corresponding to the base station based on the strength of the receiving signal, and uses a baseband demodulation (such as OOK demodulation) mode on the corresponding beam to generate a digital baseband signal. Therefore, the base station and the user terminal may not need to use an A/D device and a D/A device, greatly reducing the implementation complexity of the ultra-high-rate wireless transmission system.

Uplink Transmission

In the process of fiber enabled beam division multiple access uplink transmission, based on the reversibility of the optical transmission path, the kth user terminal transmits a signal by using the $j_k$th optical fiber port, that is, the precoding vector of uplink transmission is $w_k^u = p^u e_{j_k}$. The base station receives and detects, based on the receiving signal, the signal of the kth user terminal on the $i_k$th beam, that is, the receiving vector at the base station for detecting the kth user terminal is $a_k^u = e_{i_k}$. Because the beams allocated to different user terminals by the base station do not overlap each other, the base station uses different optical fiber transceiving ports to receive and detect signals of different user terminals, so that the multi-user uplink transmission link may also be decomposed into a plurality of parallel single-user links. Each user terminal uses, on the beam corresponding to the base station, a baseband modulation (such as OOK modulation) mode to generate an analog baseband signal, and the base station uses, based on the beam allocation result, a baseband demodulation (such as OOK demodulation) mode to demodulate on the beam allocated to each user terminal, so as to generate a digital baseband signal of each user terminal, thereby avoiding using A/D and D/A devices and reducing the implementation complexity of the system.

Figure 5A:
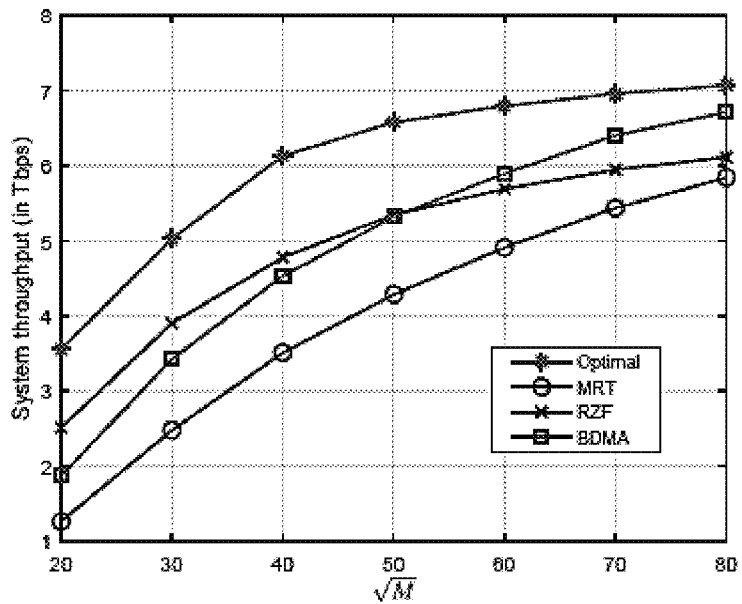
FIGS. 5A and 5B are schematic diagrams of system throughput performance.
Figure 5B:
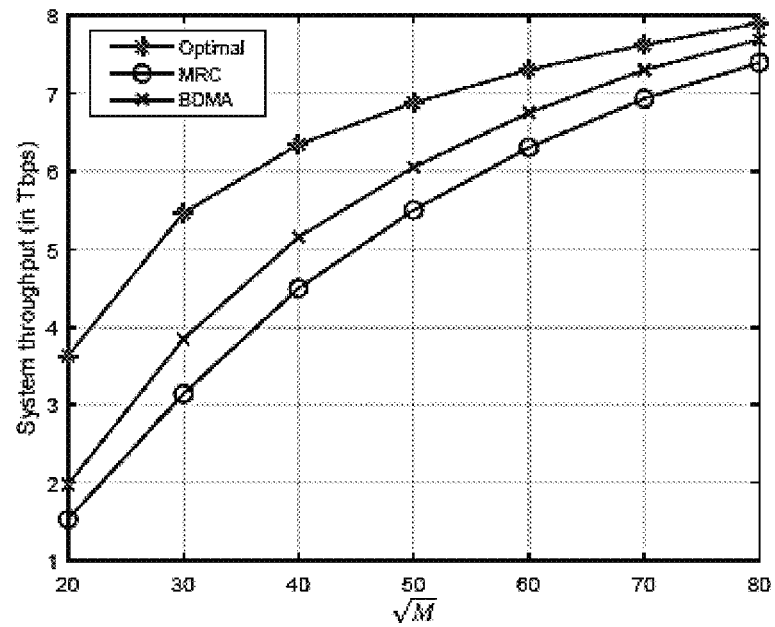

FIGS. 5A and 5B are schematic diagrams of system throughput as the number of optical fiber transceiving ports increases in a large scenario (such as an airport lounge and a gymnasium) with an area of 16 m×16 m and a height of 8 m, where the scenario has 300user terminals. In the downlink transmission process, the performance of the multi-user MIMO/massive MIMO transmission method (Optimal in the figure) and the beam division multiple access (BDMA) transmission is compared with the maximal ratio transmission (MRT) and the regularized zero forcing (RZF) precoding, and the precoding vectors of the maximal ratio transmission and the regularized zero forcing precoding are respectively $$w_k^{MRT} = \beta^{MRT} \tilde{g}_k \quad (44)$$
$$w_k^{RZF} = \beta^{RZF} \left(\sum_j \tilde{g}_j \tilde{g}_j^T + \alpha I\right)^{-1} \tilde{g}_k$$

where $\beta^{MRT}$ and $\beta^{RZF}$ are power coefficients meeting power constraint, and $\alpha$ is a regularized factor. FIG. 5A is a schematic diagram of downlink transmission performance, with the increase of the number of the optical fiber transceiving ports, the performance of beam division multiple access is better than that of RZF and MRT, and approaches the optimal performance, and the system throughput exceeds 1 Tbps. In the process of uplink transmission, the optimal design solution and the performance of beam division multiple access (BDMA) transmission are compared with maximal ratio combining (MRC), and the receiving vector of the maximal ratio combining is $$a_k^u = \frac{b_k^u}{\|b_k^u\|_2} \quad (45)$$

FIG. 5B shows a schematic diagram of uplink transmission performance, and it can be seen that as the number of optical fiber transceiving ports increases, the performance of beam division multiple access transmission approaches the optimal transmission, and is superior to the performance of MRC. In addition, when there is a relatively large number of optical fiber transceiving ports, the implementation complexity of the system for beam division multiple access downlink transmission and uplink transmission is extremely low.

What is claimed is:

1. A fiber enabled optical wireless communication (FE-OWC) method, wherein the FE-OWC method, based on an FE-OWC system, calculates a link budget of a single link transmission and establishes a channel model of an electrical signal transmission between transceiving ends;
    wherein a base station and a user terminal of the FE-OWC system are both configured with an FE-OWC apparatus, wherein one of multi-user MIMO or massive MIMO or beam division multiple access (BDMA) optical wireless communication between the base station and the user terminal is implemented;
    wherein the FE-OWC apparatus comprises an optical antenna and one or more optical chains;
    wherein the optical antenna comprises an optical fiber transceiving port array and a lens or a reflecting mirror, wherein an optical fiber transceiving port of the optical fiber transceiving port array comprises an optical fiber port and a micro-lens, and to expand an angular range of optical signals, the micro-lens is arranged adjacent to the optical fiber port, wherein the optical signals are transmitted and received by the optical fiber port;
    in a process of transmitting a first optical signal of the optical signals, the first optical signal is transmitted by a single optical fiber port of the optical fiber transceiving port array, and then the optical signal is refracted by the micro-lens to generate a first optical beam of optical beams; the first optical beam is further refracted by the lens or reflected by the reflecting mirror, resulting the first optical beam being transmitted in a direction and having a predetermined angular range; wherein the optical beams are refracted or reflected to different directions, and wherein the optical beams are transmitted by different optical fiber transceiving ports of the optical fiber transceiving port array;
    in a process of receiving a second optical signal, the optical beams are received from different directions and are refracted by the lens or reflected by the reflecting mirror, then the micro-lens refracts a second optical beam of the optical beams within a predetermined angular range into the second optical signal received by a corresponding optical fiber port of the optical fiber transceiving port array, wherein different optical fiber transceiving ports of the optical fiber transceiving port array receive the optical signals from different directions; and
    the optical fiber transceiving port array and the lens or the reflecting mirror are configured to generate the optical beams in different directions, different optical beams cover different areas, and all the optical beams cover a communication area, wherein all the optical beams are generated by the optical fiber transceiving port array, such that a full-beam coverage of the communication area is implemented;
    wherein the optical antenna is configured to transmit and receive the optical signals and the optical beams to and from different directions; the optical antenna is connected to the optical chains by an optical fiber directly, or the optical antenna is connected to the optical chains by an optical switching unit; the optical chains are configured to implement a mutual conversion between an optical signal and an electrical signal; and a first single FE-OWC apparatus communicates with a second single FE-OWC apparatus or a set of FE-OWC apparatuses;
    wherein the link budget comprises an electro-optic conversion at a transmitting end, an optical wireless channel gain, an optical-electro conversion at a receiving end, and an electrical noise at the receiving end; an electro-optic conversion part at the transmitting end establishes a relationship between an optical power and an input electrical signal based on an optical-electro property of an electro-optic conversion device, wherein the optical power is output by the transmitting end; the optical wireless channel gain is a wireless channel gain between an optical fiber transceiving port at the transmitting end and an optical fiber transceiving port at the receiving end; an optical-electro conversion part at the receiving end considers two processes of the receiving optical signal being amplified by a first optical amplifier and detected by a photodetector, and establishes a conversion relationship between an input optical signal and an output electrical signal at the receiving end; the electrical noise at the receiving end comprises an electrical noise introduced by a second optical amplifier and the photodetector, and a relationship between signal power and noise power in an electrical signal received by a single link is established; based on a single link budget, a complete channel model for transmitting the electrical signal from the transmitting end to the receiving end is established; and based on the channel model, the multi-user MIMO or massive MIMO or BDMA optical wireless communication method is implemented between a base station and user terminals.

2. The FE-OWC method according to claim 1, wherein the optical wireless channel gain describes a channel gain of an optical wireless transmission from the transmitting end to the receiving end, and the optical wireless channel gain comprises four parts: a beam modeling at the transmitting end, a channel gain of a free space transmission, a ratio of a receiving power of the optical fiber transceiving port at the receiving end, and a coupling efficiency of the optical fiber port; the beam modeling at the transmitting end describes an optical intensity distribution of a single beam, wherein the single beam is generated by the light, the light is transmitted by the optical fiber transceiving port after being refracted by the lens or reflected by the reflecting mirror, and as a number of optical fiber transceiving ports at the transmitting end increases, the optical intensities from a single optical fiber transceiving port to different user terminals are asymptotically orthogonal; the channel gain of the free space transmission considers a transmission process of the optical beam from the transmitting end to the receiving end through a free space, and the channel gain of the free space transmission is inversely proportional to a square of a transmission distance; the ratio of the receiving power of the optical fiber transceiving port at the receiving end describes a ratio of the optical power received by the single optical fiber transceiving port to a total receiving power of a user, and the ratio is proportional to a common area of an receiving light projection and the optical fiber transceiving port on a receiving plane; and the coupling efficiency of the optical fiber port is a ratio where a receiving light at the optical fiber port is coupled into the optical fiber, and the coupling efficiency of the optical fiber port is proportional to the common area of an angular range of an incident light at the optical fiber port and a receiving angle of the optical fiber port.

3. The FE-OWC method according to claim 1, wherein the FE-OWC method is the multi-user MIMO or massive MIMO optical wireless communication method implemented based on the FE-OWC system, and a communication process comprises the following steps:

a synchronization, wherein the base station broadcasts a downlink synchronization signal, and the user terminals establish and maintain the synchronization with the base station according to the received signal;

a channel sounding, wherein the user terminal transmits an uplink sounding signal, and the base station estimates channel information of each user terminal based on the received sounding signal;

a downlink transmission, wherein the base station uses the channel information of each user terminal and a low rank property of a channel to perform a precoding transmission and simultaneously transmits signals of all the user terminals, wherein the signals of all the user terminals comprise pilot signals and data signals, and each user terminal estimates the channel information based on the received pilot signals and uses the channel information to recover the data signals;

an uplink transmission, wherein the user terminal uses the precoding transmission and simultaneously transmits the signals comprising the pilot signals and the data signals to the base station, and the base station receives a signal superposition of all the user terminals, estimates the channel information of each user terminal based on the pilot signals, and uses the low rank property of the channel to perform a receiving processing and recover the data signals of each user terminal.

4. The FE-OWC method according to claim 1, wherein:

in a process of a downlink transmission, the base station estimates an uplink channel from each user terminal to the base station through an uplink sounding process, uses a reciprocity of the channel to obtain a downlink channel, decomposes a channel matrix into a product of a column vector and a row vector, calculates a received signal-to-interference-and-noise ratio and an achievable rate of each user terminal, and under a power constraint of a single optical fiber transceiving port, designs an optimal linear precoding with an objective of maximizing a sum rate; or the base station uses a maximal ratio transmission (MRT) or regularized zero-forcing (RZF) precoding method based on the row vector in a channel matrix decomposition, and uses precoding vectors to simultaneously transmit signals of all the user terminals, wherein the signals of all the user terminals comprise pilot signals and data signals; and in a process of an uplink transmission, the base station receives a signal superposition of all the user terminals, estimates an uplink channel matrix of each user terminal based on the received pilot signals, decomposes the uplink channel matrix into the product of the column vector and the row vector, and designs an optimal linear receiver with the objective of maximizing the sum rate; or the base station uses a maximal ratio combining (MRC) receiver based on the column vector in the channel matrix decomposition, and uses a linear receiver to detect received data signals and recover the transmitting signals of each user terminal.

5. The FE-OWC method according to claim 1, wherein:

in a process of a downlink transmission, each user terminal estimates a downlink transmission channel matrix based on received pilot signals, decomposes the downlink transmission channel matrix into a product of a column vector and a row vector, and designs an optimal linear receiver with an objective of maximizing a sum rate, and the user terminal uses the optimal linear receiver to detect received data signals; and in a process of an uplink transmission, each user terminal uses a reciprocity of a channel to obtain uplink channel information based on a downlink estimation, decomposes the channel matrix into the product of the column vector and the row vector, and under a total power constraint, designs a linear precoding vector with the objective of maximizing the sum rate, and the user terminal uses the precoding vector to transmit uplink signals, wherein the uplink signals comprises the pilot signals and the data signals.

6. The FE-OWC method according to claim 1, wherein the FE-OWC method is the BDMA optical wireless communication method implemented based on the FE-OWC system; the BDMA optical wireless communication method is that the base station allocates non-overlapping beams for different user terminals based on channel information of each user terminal, each beam transmits and receives signals of at most one user terminal, and optical beams of different directions simultaneously communicate with the user terminal bi-directionally; the user terminal selects beams in corresponding directions of the base station based on the channel information, and uses a single beam to communicate with a single base station; and a communication process comprises the following steps:

a synchronization, wherein the base station broadcasts a downlink synchronization signal, and the user terminal establishes and maintains the synchronization with the base station according to the received signals;

a channel sounding, wherein the user terminal transmits an uplink sounding signal, the base station allocates beams for each user terminal based on the received sounding signal, and communicates with user terminals by the non-overlapping beams on a same time-frequency resource, wherein only one beam is allocated to each user;

a downlink transmission, wherein the base station transmits independent signals on the beam allocated for each user terminal according to a beam allocation result, and based on the received signals, each user terminal selects a beam corresponding to the base station to perform a receiving detection; and an uplink transmission, wherein each user terminal transmits signals on a beam corresponding to the base station, and based on the beam allocation result, the base station receives and detects transmitting signals of each user terminal on the beam allocated for each user terminal.

7. The FE-OWC method according to claim 1, wherein:

in a process of a downlink transmission, the base station transmits, based on a beam allocation result, a signal to each user terminal, different beams transmit signals of different user terminals, a multi-user downlink transmission link is decomposed into a plurality of parallel single-user links, and the base station uses a baseband modulation mode to generate a user analog baseband transmitting signal; and in a process of an uplink transmission, the base station receives and detects the transmitting signal of each user terminal on the beam allocated for each user terminal based on the beam allocation result, the base station receives and detects signals of different user terminals by using different beams, a multi-user uplink transmission link is decomposed into the plurality of parallel single-user links; and the base station generates a digital baseband signal of each user terminal by using a baseband demodulation mode.

8. The FE-OWC method according to claim 1, wherein:

in a process of a downlink transmission, each user terminal selects a beam corresponding to the base station based on a strength of the receiving signal, and uses a baseband demodulation mode to generate a digital baseband signal on a corresponding beam; and in a process of an uplink transmission, each user terminal uses a baseband modulation mode to generate an analog baseband signal on the beam corresponding to the base station.

\* \* \* \* \*